United States Patent
Bickes, Jr. et al.

(10) Patent No.: US 6,438,191 B1
(45) Date of Patent: Aug. 20, 2002

(54) EXPLOSIVE SCABBLING OF STRUCTURAL MATERIALS

(75) Inventors: Robert W. Bickes, Jr.; Lloyd L. Bonzon, both of Albuquerque, NM (US)

(73) Assignee: Sandia Corporation, Albuquerque, NM (US)

(*) Notice: Subject to any disclaimer, the term of this patent is extended or adjusted under 35 U.S.C. 154(b) by 0 days.

(21) Appl. No.: 09/052,762

(22) Filed: Mar. 31, 1998

(51) Int. Cl.[7] .............................. G21F 9/00; G21F 9/28; G21C 19/00; F42D 1/00; F42D 3/00
(52) U.S. Cl. ....................... 376/308; 376/260; 376/463; 102/302; 102/307; 149/89
(58) Field of Search .................. 376/308, 260

(56) References Cited

U.S. PATENT DOCUMENTS

| | | | | |
|---|---|---|---|---|
| 3,661,086 A | * | 5/1972 | Thomanek et al. | 102/56 |
| 4,925,505 A | * | 5/1990 | Baker et al. | 149/89 |
| 4,946,521 A | * | 8/1990 | Walker et al. | 149/36 |
| 5,014,623 A | * | 5/1991 | Walker et al. | 102/477 |
| 5,037,159 A | * | 8/1991 | Nutter et al. | 299/37 |
| 5,212,340 A | * | 5/1993 | Hardt et al. | 102/223 |
| 5,307,743 A | * | 5/1994 | Jones | 102/307 |
| 5,308,149 A | * | 5/1994 | Watson et al. | 299/13 |
| 5,679,172 A | * | 10/1997 | Pritt | 134/6 |
| 5,810,098 A | * | 9/1998 | Wathen | 175/4.58 |
| 5,900,578 A | * | 5/1999 | Wathen | 102/313 |

FOREIGN PATENT DOCUMENTS

DE 2745458 * 4/1979

OTHER PUBLICATIONS

Benham et al, "LDRD Summary Report: Part l & ll", Sandia Report, SAND96–2470, all pages, Jan. 1996.*

Hanjalic et al, "Detonation–wave technique for On–load Deposit Removal from Surfaces Exposed to Fouling: Part 1—Experimental Investigation and Development of the Method", Journal of Engineering for Gas Turbines and Power, vol. 116, pp. 223–230, Jan. 1994.*

Hanjalic et al, "Detonation–wave Technique for the On–load Deposit Removal from Surface Exposed to Fouling: Part ll—Full Scale Application", Jouranl of Engineering for Gas Turbines and Power, vol. 116, pp. 231–236, Jan. 1994.*

* cited by examiner

Primary Examiner—Charles T. Jordan
Assistant Examiner—Jack Keith
(74) Attorney, Agent, or Firm—Brian W. Dodson

(57) ABSTRACT

A new approach to scabbling of surfaces of structural materials is disclosed. A layer of mildly energetic explosive composition is applied to the surface to be scabbled. The explosive composition is then detonated, rubbleizing the surface. Explosive compositions used must sustain a detonation front along the surface to which it is applied and conform closely to the surface being scabbled. Suitable explosive compositions exist which are stable under handling, easy to apply, easy to transport, have limited toxicity, and can be reliably detonated using conventional techniques.

6 Claims, 1 Drawing Sheet

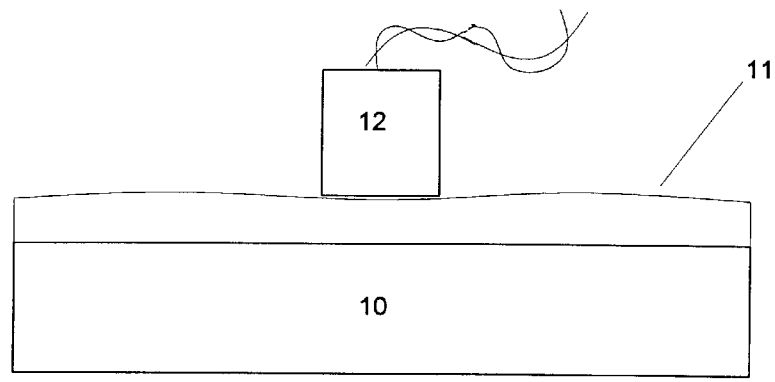
Figure 1a
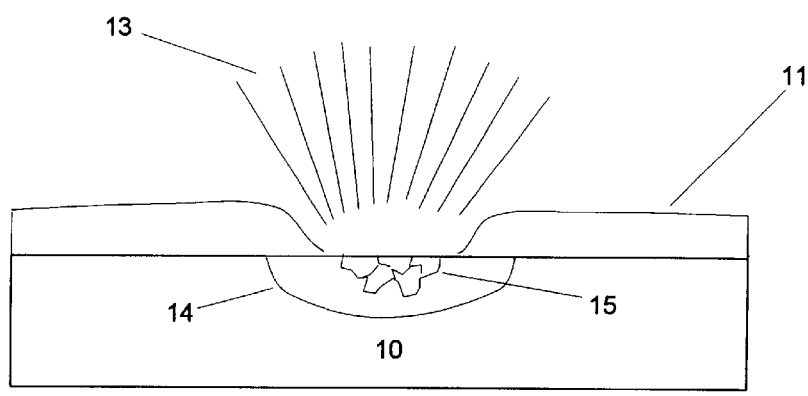
Figure 1b
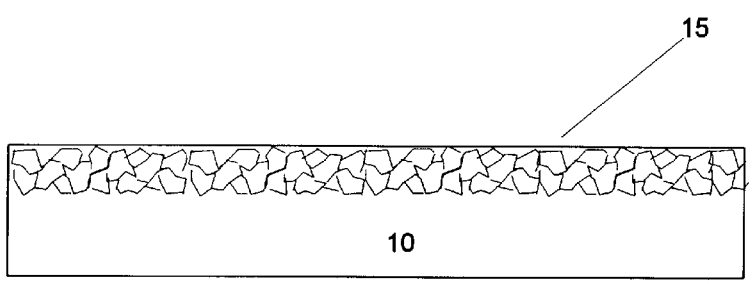
Figure 1c
Figure 1

EXPLOSIVE SCABBLING OF STRUCTURAL MATERIALS

GOVERNMENT RIGHTS

This invention was made with United States Government Support under Dept. of Energy Contract No. DE-AC04-94AL85000. The Government has certain rights in this invention.

BACKGROUND OF THE INVENTION

The present invention relates generally to the removal of surface layers of structural materials, especially concrete and masonry. More specifically, the present invention acts to remove surface layers of structural materials by placing controlled amounts of energetic materials (explosives) onto the surface and detonating the explosive in a controlled and safe manner. The present invention has special application to decontamination of chemical and nuclear facilities.

The removal of surface layers from a wall, ceiling, or floor by pulverization is known as scabbling. Scabbling is carried out for a number of purposes, including removing a worn or damaged surface layer for refinishing, to produce a rough surface on a structural member so as to insure bonding another member thereto, and removing contaminated surface layers from a structure so that the internal portions of the structure, which is uncontaminated, can be demolished or recycled using conventional techniques.

Of particular interest is the application of scabbling in decommissioning nuclear power plants and related facilities. The Department of Energy estimates that on the order of one trillion dollars will be required over the next 60 years in order to decommission obsolete nuclear facilities worldwide.

A major problem in such decommissioning is radioactive contamination of surfaces. Even though such contamination often does not penetrate into the central regions of structural materials, the entire mass of a building becomes mixed radioactive waste if conventional methods of demolition (e.g., explosive dismantling, wrecking ball, etc.) are used. The care required to handle such mixed waste is similar to that required to handle the contaminated surface material, if it were removed and handled separately. As the bulk of the building is much greater than that of the contaminated surfaces, perhaps an order of magnitude less contaminated waste need be generated, collected, transported, and disposed of if the contaminated surfaces can be easily removed.

If scabbling is to be used to remove contaminated surface layers from structural surfaces of a building, it is clear that the technique chosen must produce as small an amount of dust as possible in the process of rubbleizing the surface, and that the dust that is produced can be effectively collected and disposed of. Any dust produced during scabbling or later clean-up must be considered to be contaminated, and cannot be released to the environment. In particular, it cannot be allowed to spread through the building and recontaminate previously cleaned surfaces. In current practice, scabbling a concrete surface while maintaining acceptable dust management costs $50–250 per square meter of surface—potentially tens of millions of dollars on a single facility. This does not consider costs associated with contamination of the machinery (usually large and complex) with which the scabbling is carried out.

Applications of scabbling are not restricted to decommission of nuclear facilities. Similar application can be made to contaminated chemical or biological facilities. In addition, scabbling can be used, e.g., on a worn concrete surface to remove the worn layer for subsequent replacement. Scabbling is often used with reference to concrete surfaces, but it can be applied to any structural material which is brittle and prone to fracture, including concrete, cement reinforced concrete, ceramics, tile, brick, cement block, stone, gypsum, and glass. For example, controlled scabbling will remove tile from a concrete subfloor. In milder forms, scabbling can even be used to remove corrosion from metal structural members.

Conventional scabbling techniques range over a wide range of technology. Simple mechanical insult is perhaps the standard, usually in the form of tungsten carbide penetrators driven by pneumatic pressure, although simple flails are sometimes used. Abrasive sprays and flails can also be used, although they are typically slower in action and produce enormous quantities of dust.

Mechanical shock waves can be used to spall flakes of the surface layers free from the body of the material. Among the methods which have been investigated for such removal are included pulsed laser irradiation, in which the sudden surface heating sends a shock wave into the material bulk, causing spallation of the surface. Another approach is electro-hydraulic excitation, in which an electric discharge sets up a shock wave in a fluid between the discharge electrodes. The shock wave is carried by the liquid to a nearby surface to be treated, where it causes spallation of the surface.

Shock wave based techniques for scabbling are quite promising, as they act to spall the material at natural weak spots, thereby reducing the surface layers to rubble of reasonably consistent dimensions with a minimum of dust formation. Unfortunately, the shock wave methods described above require complex, somewhat delicate, and rather expensive equipment to carry out the scabbling operation. In addition, with current technology only a very limited surface area can be treated using such techniques, owing to the huge energy densities (on the order of a kilojoule per cubic centimeter of scabbled material) required for effective scabbling.

There is thus a need for a new approach to scabbling surfaces of structural materials which preserves the beneficial features of the shock-wave techniques, but which can be carried out easily and inexpensively on large-scale projects. An additional need when scabbling is used for decontamination is to limit the amount of machinery required to carry out the scabbling operation, so as to reduce decontamination and replacement costs associated directly with the scabbling equipment.

The present invention addresses the above needs by using mild and relatively safe explosives to generate the shock waves needed to drive the scabbling process. Layers of explosives can be coupled to surfaces to be scabbled so that shock waves of the magnitude and duration required for efficient scabbling are produced therein. In addition, there is essentially no machinery exposed during the actual scabbling process (i.e., when the explosives detonate). Continual decontamination of complex machinery is thus avoided in the present invention.

Previous attempts to apply explosives for scabbling were applied in the form of flexible sheets of explosive (typically pentaerythritol tetranitrate (PETN) embedded in a rubber sheet). The results have been mixed, partially owing to the inevitable gaps between the explosive sheet and the surface to be scabbled. Intimate contact is required to effectively transmit the required shock wave into the (typically very rough) surface to be removed. Such contact could be approximated by using, e.g., prior art plastic explosives "buttered" onto the surface. However, such formulations are difficult to apply with the delicacy required for controlled scabbling, and the extensive handling required dramatically raises both safety concerns and the ultimate cost of the scabbling operation.

The present invention solves the problem of contact with the surface to be scabbled by using explosive compositions which conform to the surface to be scabbled. In one implementation a thin layer of an explosive. composition is sprayed onto the surface. In another implementation, foamed explosives are applied to the surface. The compositions used are less energetic by volume than are conventional high explosives, and can be tailored to deliver a shock wave suitable for removing anywhere from a thin layer of concrete to a layer several inches thick. The rubble which results from use of the instant invention is conveniently sized for collection and disposal, and is generated with a minimum of dust.

SUMMARY OF THE INVENTION

The present invention pertains to a new approach to scabbling surfaces of structural materials. The essence of the new approach is to apply a thin layer of a mildly energetic explosive composition to the surface to be scabbled. The composition must be capable of sustaining a detonation front along the surface to which it is applied, but the intensity of the shock wave generated in the surface is typically less than that usually associated with conventional high explosives. The composition, when applied, conforms closely to the shape of the surface to be scabbled. For practicality, the composition should be stable under handling, easy to apply, easy to transport, have limited toxicity, and reliably detonate using conventional techniques.

BRIEF DESCRIPTION OF THE DRAWINGS

FIG. 1 shows a schematic illustration of the function of the instant invention.

DETAILED DESCRIPTION

The present invention comprises an environmentally friendly and safe class of explosive-driven scabbling methods. The essence of such methods is shown schematically in FIG. 1. In FIG. 1a explosive layer 11 is applied (typically by spraying or as an aerosol foam) to an exposed surface of a structural material 10 which is to be scabbled. A detonator 12 is placed atop explosive layer 11. Detonator 12 is then activated. FIG. 1b shows the system immediately after detonation has been initiated in the explosive layer. A plume of explosive products 13 is generated as the detonation front travels outward along the surface from the point at which the detonation was initiated. The detonation drives a shock wave 14 into the structural material 10. Shock wave 14 and associated release and reverberating waves (not shown) spalls and pulverizes the surface of the structural material 10, producing a rubbelized region 15. The final configuration appears in FIG. 1c, where the explosive has entirely been consumed, and the structural material 10 is covered by a rubbelized layer 15 consisting of lumps of the surface layers of the structural material. Little if any damage is done to the central regions of the scabbled structural material. The depth and the size of the rubble generated by such scabbling depend on the thickness of the explosive layer and the strength and brisance of the explosive composition therein.

Structural materials suitable for scabbling using the instant invention include concrete, reinforced concrete, cement (including grout and adhesives), ceramics, tile, brick, concrete block, stone, gypsum, glass, and other materials brittle under abrupt impact. Such materials may have paint or other coatings; such coatings need not be removed for explosive scabbling.

The instant invention can be used with sprayed explosive compositions and with foamed explosive compositions. Many conventional explosive materials can be used in compositions suitable for practicing the instant invention; among these are trinitrotoluene (TNT), pentaerythrol tetranitrate (PETN), cyclotrimethylene trinitramine (RDX), cycletertrmethylene tetranitramine (HMX), hexanitrostilbene (HNS), triaminotrinitrobenzene (TATB), and trinitrophenylmethylnitramine (Tetryl). Mixtures of these materials can of course be used as well, and in some situations use of admixtures will allow the detonation characteristics of the composition to be tailored. In pure form these are secondary explosives too powerful for routine use in scabbling. However, when diluted even slightly within a matrix or a carrier, they have suitable properties for scabbling according to the instant invention.

Another class of explosives which can be used to carry out the instant invention are the nitroparaffins, especially nitromethane. Numerous members of this family are liquid at STP, and, together with suitable surfactants and thickeners, can be blown into foamed explosives suitable for the instant invention. Most notably, nitromethane combined with propane and certain additives forms a commercial composition known as Lexfoam™. Lexfoam™ is stored under pressure as a liquid. On being released under pressure from a suitable orifice, Lexfoam™ forms a dense, lasting, and reasonably adherent foam which can be detonated using conventional techniques. Addition of small amounts (5–10% by weight) of PETN powder has been used to increase the energy density of Lexfoam™ without losing the desirable properties of the foam. The detonation properties of Lexfoam™ turn out to be well suited to practice of the instant invention. In addition, both nitromethane and propane may be transported and handled as flammable liquids, rather than as explosives, thereby greatly reducing the difficulty usually associated with large-scale use of explosive materials.

Another class of liquid explosives suitable for use as explosive foams are those based on extremely concentrated aqueous solutions of nitrate oxidizers. The best known of these is hydroxylammonium nitrate (HAN), which in a solution with 20% water (by weight) forms a remarkably safe monopropellant, whose performance can be further improved by introducing additional fuel, e.g., ~20% triethanolammonium nitrate (TEAN). This latter solution has the approximate composition of LP XM46, the US Army's prime candidate for use in liquid-fueled cannon. The residual water, however, keeps the above compositions from detonating.

If the amount of water is reduced to below 10%, however, true explosive behavior can be obtained. A typical explosive composition will have 40–90% HAN, 10–60% TEAN, and 2–10% water (% by weight). More favorably the proportion of water is 7–10%. A specific composition which has been used successfully as an explosive is 73% HAN, 23% TEAN, and 4% water by weight. Transportation is again easy, as neither HAN in water nor TEAN in water are classified as explosives—only when they are mixed together can an explosion take place.

Nitromethane and the HAN-based nitrate explosives both have moderate detonation pressures and brisance when compared to the pure secondary explosives. When incorporated into a foam the pressures coupled into structural materials are compatible with practice of the instant invention.

How much explosive is required to successfully scabble a surface? Unfortunately this is not a simple question. The answer depends on the depth of scabbling desired, the type of material, the detonation pressure of the explosive, the shape and length of the shock wave, the coupling of the shock wave into the exposed surface, and many other factors. In practice, however, we find that an explosive mass density on the order of 0.1 to 1 gram/cm$^2$ [1 to 10 kilograms per square meter of exposed surface] produces significant scabbling on concrete and related structural materials. These densities are small enough that explosive scabbling can be safely accomplished inside a building.

A slurry of silver-acetylide and silver nitrate explosive suspended in acetone has long been used as a sprayable explosive composition. PETN powder can be incorporated to increase the explosive power of the composition by dissolving the PETN in the acetone. However, the silver acetylide-silver nitrate explosive is far too susceptible to accidental detonation to use for routine scabbling operations. In addition, aromatic solvents and/or diluents, such as toluene and acetone, are environmentally unacceptable for large-scale spray use, and present a considerable fire hazard. Practice of the instant invention thus requires safer explosive compositions, specifically suited to the needs thereof.

For the instant invention, a sprayable explosive composition typically comprises an explosive material, a spray diluent, and a binding agent which dissolves in the spray diluent. An explosive powder which does not dissolve in the diluent is generally chosen. This is because the explosive performance depends not only upon the amount of explosive in the composition, but also on the particle size, size distribution, shape, and separation of particles in the sprayable explosive composition after application.

One implementation of a sprayable explosive composition for scabbling consists of PETN powder mixed into a solution of shellac in isopropanol or ethanol. (Other short-chain alcohols can also be used.) The PETN powder was obtained from the Ensign Bickford Company of Simsbury, Conn. The material is designated "Super Fine PETN Powder, 5–8 micron", and is shipped under water and ethanol. Between 5 and 10% shellac by weight was used for all tests, and 7.4% was taken as the standard. Alcohol was added as needed to obtain satisfactory spraying of the explosive composition.

Commercial high volume low pressure (HVLP) spraying systems were used to apply the sprayable compositions. Other techniques, such as airless spraying, can be used in the instant application. However, HVLP spraying systems apply material without losing large quantities of spray diluent in the spraying process and produce a small amount of scattered dust. The sticking efficiency of HVLP systems is high, leading to fewer problems with explosive being deposited outside the immediate area to be scabbled. Using a hand-held HVLP spray guns, a layer 1.5 mm thick was deposited at a rate of 1 to 3 square meters per hour.

A real concern with explosive scabbling using sprayable explosives is that the resulting explosive layer should be able to sustain a detonation front parallel to the surface to which it is applied. Otherwise initiation of the explosive sheet cannot be carried out at a small number (preferably one) of points on the explosive layer.

Any explosive composition has a characteristic thickness below which a partially unconfined detonation will not propagate freely. (The interface between the explosive layer and the surface to be scabbled provides partial containment of the reaction products of the explosive, but expansion at the free surface of the explosive layer allows pressures and temperatures to drop rapidly, thereby acting to quench the detonation.) Using the sprayable composition described above, the minimum layer thickness for free propagation of a detonation front along a surface was found to be less than 0.5 mm. As coatings suitable for scabbling will generally be in excess of 1 mm in thickness, the ability of this composition to sustain a detonation front is quite satisfactory.

Various conventional means were used to initiate the sprayed explosive layers. These included firing a bridgewire detonator in contact with the explosive layer, driving a flyer plate into the explosive layer, and driving a 6 mm steel ball into the explosive layer at velocities above 200 m/sec. All initiation methods which supplied more than 20 joules of energy to a millimeter-sized region were successful. The Chapman-Jouget pressure of the detonation was about 3 GPa—more than sufficient to scabble concrete.

The instant invention can also be carried out using foamed explosives. A foamed explosive can comprise a powdered explosive material dispersed in a (typically organic) foam matrix. It can also comprise a liquid explosive material combined with a foaming agent and gas into an explosive foam. (Other additives, such as an adherant to improve adhesion to the exposed surface, or a thickener to increase the operating life of the foam or to allow self-supporting applications, can also be added.) The liquid explosive material can also consist of a solid explosive in a solvent. Different varieties of foamed explosives can be combined to tailor the detonation characteristics of the end product. For the purpose of carrying out the present invention the foam should be non-rigid when applied to the surface to be scabbled, so that it will properly conform to the surface. Note that explosive foams need not become rigid to be used in the instant invention; if they do, however, they should be applied prior to achieving rigidity.

There are several reasons to consider foamed explosives for the instant invention. Certain flammable liquids (most notably nitromethane) become explosive when incorporated into a foam. This allows relatively simple handling of the scabbling agent until immediately prior to use, when it is transformed into an explosive foam. As many foams have a finite lifetime before they collapse again to their liquid state, this also means that overlooked explosive foam will quickly degrade and lose the ability to explode.

Another advantage of foams is that many conventional explosives are too powerful for convenient use in scabbling. When incorporated into a foam, however, the density of explosive is reduced, and the pore volume acts to reduce both the pressure and velocity of a detonation. This allows the energy of the explosion to be coupled more efficiently into breaking the surface into rubble, rather than shattering the surface into dust. A further advantage of foam is that it tends to remain where applied—a considerable safety factor when operating in active construction sites.

The explosive used in scabbling should make intimate contact with the exposed surface. This occurs automatically when a thin layer of sprayed explosive is applied to a surface, unless that surface has a reentrant or otherwise complex surface geometry. When foamed explosives are used, they are usually sprayed onto the surface as the foam is being made, i.e., before any curing into a rigid foam can occur. Note that a third possibility exists, in which one or more layers of an inert substance are first used to overcoat the surface to be scabbled, and then a layer of spray or foamed explosive is place over the inert layers. The inert layer can serve two purposes here. It can produce a flat surface on which to apply the explosive composition. It can also be used to serve an impedance matching function, so that the energy of the explosive is coupled most efficiently into the scabbling process, i.e., into rubbleizing the surface without shattering.

Another process which can be used to apply an explosive foam to the exposed surface is to apply an explosive foam precursor to the exposed surface. The explosive foam precursor contains within it a source of gas, which produces bubbles in the precursor, thereby turning it into foam in situ. Various epoxy resins are known to have this property, and can be used as precursors in admixture with explosive powders. Caution must be used to select material systems so that creating the foam in situ does not produce enough heat to destabilize the explosive material.

More commonly, however, an explosive foam will be generated as it is applied to the surface to be scabbled. This is usually carried out by combining a liquid explosive composition with a compressed liquefied gas, forming a liquid-liquid emulsion. (An emulsifier can be added to improve the characteristics of the resulting emulsion.) When pressure is released, typically by spraying the emulsion onto the exposed surface as an aerosol, the liquefied gas will revert to gas, and explode the self-assembled micelles of the emulsion into foam cells. These cells are then maintained by surface tension and the action of the foaming agent(and possibly by other additives, such as thickening agents and adherants) in a manner known to one skilled in the art. A variety of compressed liquefied gases are suitable for such application, including propane, butane, carbon dioxide, nitrous oxide, and ethylene oxide.

Techniques exist to mix an external gas under pressure into a liquid, forming therefrom a foam. Such techniques can also be used to practice the instant invention. However, these techniques often require additional equipment (gas supply tanks, compressors, etc.), and involve a turbulent mixing phase—not always a good thing to do with explosive compositions.

Scabbling of concrete surfaces was carried out using Lexfoam™, a commercial mixture of nitromethane, propane, and a foaming agent. When stored under pressure, Lexfoam™ is a well-behaved flammable liquid. When that pressure is suddenly released, as when the material is sprayed from a nozzle, it forms a long-lasting foam with good adherence to surfaces. The density of the foam depends on the amount of propane in the emulsion, but as used for scabbling it is typically between 0.15 and 0.5 g/cc, which corresponds to detonation pressures roughly between 0.5 and 1.5 GPa. These parameters are well adapted for concrete scabbling.

Experiments were carried out involving concrete piles some 8 inches in diameter. One end of each piles was chosen for scabbling—the curved sides of the piles were not scabbled. A collar was fixed around the end of the pile, extending some distance from the surface to hold the Lexfoam™ in place and provide a guide as to the overall thickness of the Lexfoam™. Layers of foamed nitromethane 6, 12, and 25 mm in thickness were placed on the ends of the piles and detonated. In all cases scabbling was observed, resulting in walnut-sized rubble and a minimum of dust. The 25 mm layer, having an explosive mass density of about 10 kilograms/square meter, scabbled the surface to a depth of about 5–8 cm.

Specific implementations were described above to point out and disclose the most important elements of the instant invention. However, there is no intent to limit the scope of the instant invention to those specific implementations. The scope of the instant invention is intended to be limited only by the appended claims.

What is claimed is:

1. A method to scrabble an exposed surface of structural materials, comprising:
    a) coating the exposed surface of structural materials with one or more layers of inert material;
    b) applying a layer of explosive material to the exposed surface of the one or more layers of inert material, such that said layer of explosive material is sufficiently thick to sustain a detonation front propagating parallel to the exposed surface; and,
    c) initiating a detonation front in the layer of explosive material so that the detonation front freely propagates throughout the layer of explosive material.

2. The method of claim 1, wherein the exposed surface of the layers of inert material is flat and smooth.

3. A method to scabble an exposed surface of structural materials, comprising:
    a) applying a layer of explosive foam onto the exposed surface, said layer having sufficient thickness to sustain a detonation front propagating parallel to the exposed surface, wherein applying said layer of explosive foam comprises coating the exposed surface with an explosive foam precursor, and transforming the explosive foam precursor into a layer of explosive foam; and,
    b) initiating a detonation front in the layer of explosive foam so that the detonation front freely propagates throughout the layer of explosive material.

4. A method to scabble an exposed surface of structural materials, comprising:
    a) applying a layer of explosive foam onto the exposed surface, said explosive foam comprising an aqueous solution of hydroxylammonium nitrate (HAN) and a foaming agent, and said layer having sufficient thickness to sustain a detonation front propagating parallel to the exposed surface; and,
    b) initiating a detonation front in the layer of explosive foam so that the detonation front freely propagates throughout the layer of explosive material.

5. The method of claim 4, wherein the liquid explosive composition further comprises between 10% and 60% triethanolammonium nitrate (TEAN) by weight.

6. The method of claim 5, wherein the liquid explosive composition consists essentially of 73% HAN by weight, 23%TEAN by weight, and 4% water by weight.

* * * * *